(12) United States Patent
Murphy

(10) Patent No.: US 6,907,223 B2
(45) Date of Patent: Jun. 14, 2005

(54) METHOD, DEVICE AND SYSTEM FOR PROVIDING EDUCATIONAL SERVICES

(75) Inventor: Rick L. Murphy, Bullhead City, AZ (US)

(73) Assignee: Mad Dog Software, L.L.C., Lake Havasu City, AZ (US)

( * ) Notice: Subject to any disclaimer, the term of this patent is extended or adjusted under 35 U.S.C. 154(b) by 0 days.

(21) Appl. No.: 10/729,711

(22) Filed: Dec. 5, 2003

(65) Prior Publication Data

US 2004/0081953 A1 Apr. 29, 2004

Related U.S. Application Data

(63) Continuation of application No. 10/090,460, filed on Mar. 4, 2002.

(51) Int. Cl.[7] ................................. G09B 3/00
(52) U.S. Cl. .................. 434/350; 434/118; 434/322
(58) Field of Search ................................ 434/118, 169, 434/201, 307 R, 322, 323, 350, 362, 365; 705/14, 51; 706/927; 713/185, 200

(56) References Cited

U.S. PATENT DOCUMENTS

| | | | | |
|---|---|---|---|---|
| 5,727,950 A | * | 3/1998 | Cook et al. ................. | 434/350 |
| 5,827,070 A | * | 10/1998 | Kershaw et al. ............ | 434/322 |
| 6,234,806 B1 | * | 5/2001 | Trenholm et al. ........... | 434/322 |
| 6,301,462 B1 | * | 10/2001 | Freeman et al. ............ | 434/350 |
| 6,519,571 B1 | * | 2/2003 | Guheen et al. .............. | 705/14 |
| 2002/0112171 A1 | * | 8/2002 | Ginter et al. ............... | 713/185 |
| 2002/0116266 A1 | * | 8/2002 | Marshall ..................... | 705/14 |
| 2002/0156857 A1 | * | 10/2002 | Brewer et al. .............. | 709/206 |
| 2003/0008266 A1 | * | 1/2003 | LoSasso et al. ............ | 434/118 |

* cited by examiner

Primary Examiner—Joe H. Cheng
(74) Attorney, Agent, or Firm—Reed Smith LLP

(57) ABSTRACT

A method for providing educational services to at least one user engaging in at least one activity, the method including: enabling an agent to automatically monitor the user's engaging in the at least one activity; automatically and temporarily interrupting the engaging in the at least one activity using the enabled agent dependently upon the detecting; automatically presenting educational services to the at least one user using the enabled agent; and, allowing the at least one user to reengage with the activity based upon user interaction with the enabled agent; wherein, the user interaction is associated with the educational services.

2 Claims, 4 Drawing Sheets

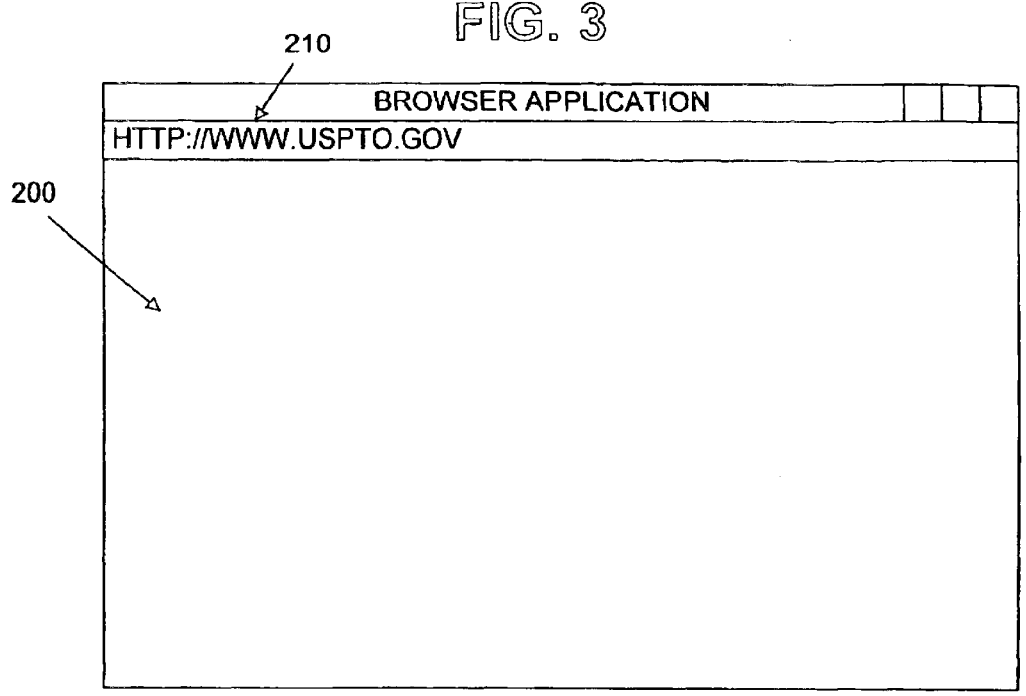
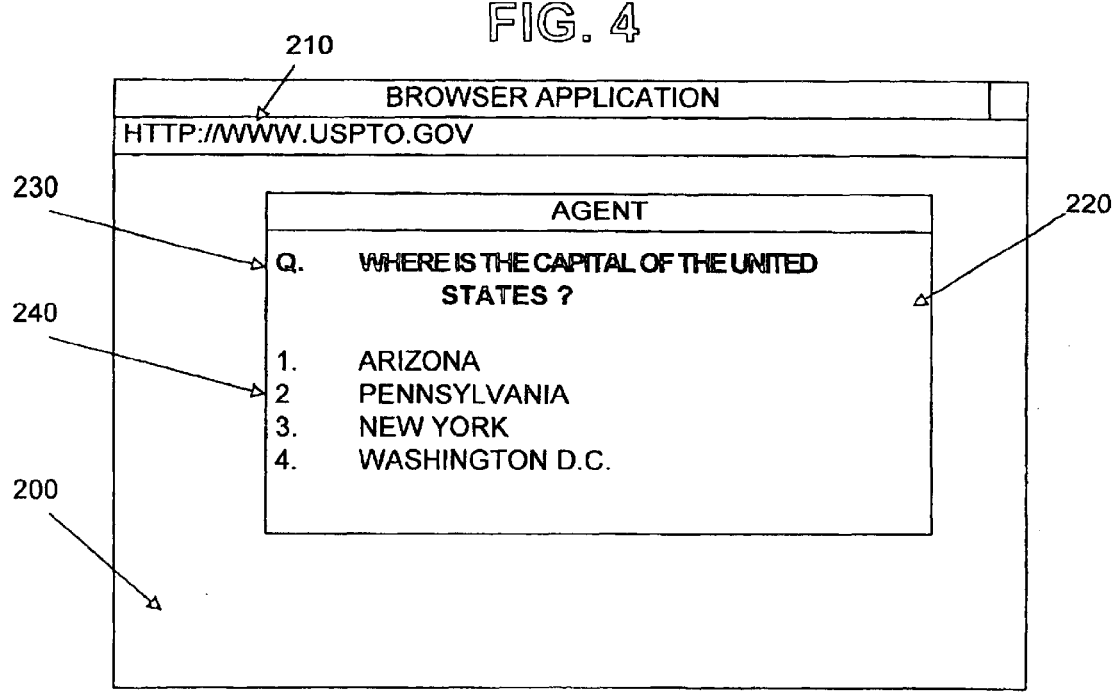

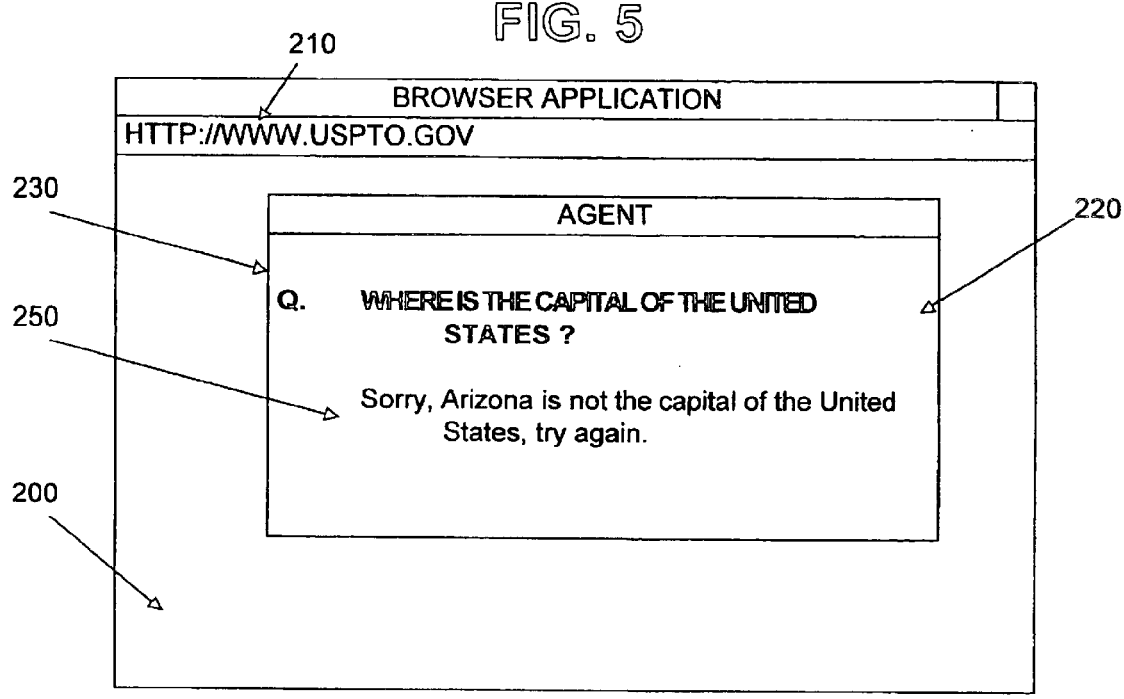
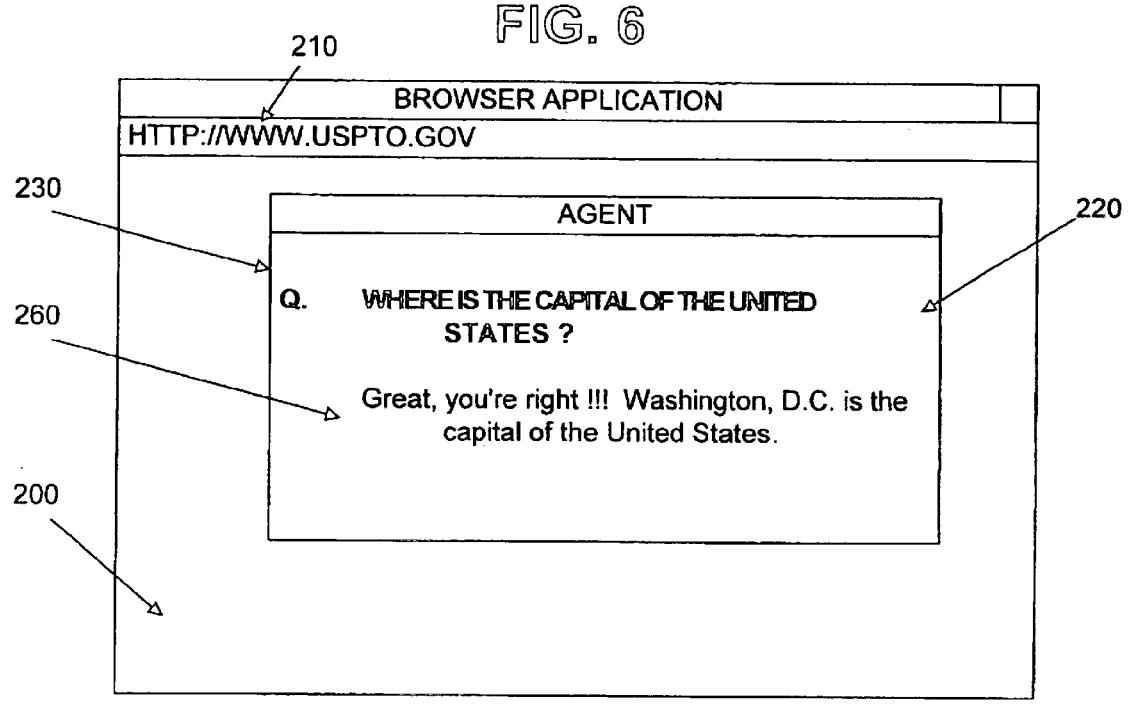

# METHOD, DEVICE AND SYSTEM FOR PROVIDING EDUCATIONAL SERVICES

CROSS REFERENCE TO RELATED APPLICATIONS

This application is a continuation of U.S. application Ser. No. 10/090,460 entitled "METHOD, DEVICE AND SYSTEM FOR PROVIDING EDUCATIONAL SERVICES," filed Mar. 4, 2002, which is hereby incorporated by reference herein as if set being set forth herein in its entirety.

FIELD OF THE INVENTION

The present invention is directed generally to educational and training methods, devices and systems.

BACKGROUND OF THE INVENTION

Educational software that tests specific subjects for specific levels of learning is generally known in the art. Tests may serve to reinforce the educational process and/or to provide feedback regarding a student's progress. Terms such as "user", "child", "student", "player", or "test taker", as used herein, should be understood to mean any participant in, or user of, educational software or an educational system that tests and/or reinforces and/or provides feedback regarding the user's knowledge in a formal or informal manner.

Although a wide range of software for home and business use exists, educational software is often primarily directed towards grade school aged children. It is believed to be generally desirable that educational software or programs have some entertaining quality in order to maintain a subject's attention. Thus, many educational programs are designed to be both entertaining and provide testing. Educational aspects and tests may be incorporated into game play such that a game has an underlying educational purpose.

Popular examples of commercially available, personal computer ("PC") based educational software titles include "Math Blaster", "Where in the World is Carmen SanDiego", and "Word Munchers", among many others. Although educational in nature, these software products generally exhibit a significant entertainment component so as to compete with other forms of entertainment or activity. These other forms of entertainment may include video games playable using computing devices such as PC's or video game consoles, television and/or playback of recorded programming using a suitable device such as a Video Cassette Recorder ("VCR") player or Digital Versatile Disc ("DVD") player, and/or the use of the global interconnection of computing devices and computer networks, commonly referred to as the Internet.

For many parents and students alike, using educational software at home can prove to be a difficult or undesirable task, as even the best designed educational software title may not be able to effectively compete for a child's attention with these other forms of entertainment. Many current products require that the student be isolated, and that learning be individual and substantially continuous, for example. This may further serve to make the educational product less appealing to a student, and less likely that the educational software will be successful in its goal of education or training. Additionally, parents or supervisors may find it difficult to monitor a student's progress, or to monitor how often educational software that was provided by purchase and installation on a suitable computing device is actually used.

Educational software may provide periodic testing, or more intensive training such as multi-day training sessions, for example. A drawback of such training is the time commitment employees or student must devote to such training sessions. Often, temporally fixed training meetings can be disruptive not just in time consumed, but also in terms of scheduling for an individual employee.

It can be seen from the above that there is a need for an educational method and system which permits a user to effectively compete with outside distractions, provides the administrator of such a product substantial control over how the educational efforts proceed, how questions are asked, when the questions are asked and what type of questions are asked, for example, and for the process to be sufficiently efficient so as not to represent a significant disruption to a user's ordinary course of action or activity.

BRIEF SUMMARY OF THE INVENTION

A method for providing educational services to at least one user engaging in at least one activity is disclosed. The method includes enabling an agent to automatically monitor the user's engaging in the at least one activity; automatically and temporarily interrupting the engaging in the at least one activity using the enabled agent dependently upon the detecting automatically presenting educational services to the at least one user using the enabled agent and, allowing the at least one user to reengage with the activity based upon user interaction with the enabled agent. The user interaction may be associated with the educational services.

BRIEF DESCRIPTION OF THE FIGURES

The present invention will now be described in connection with the following figures in which like reference numbers refer to like elements and wherein:

FIG. 3 illustrates a web page displayed which corresponds to a student entered URL; and, FIGS. 4–6 illustrate displays according aspects of the present invention which correspond to the web page of FIG. 3.

DETAILED DESCRIPTION OF THE PREFERRED EMBODIMENTS

Figure 1:
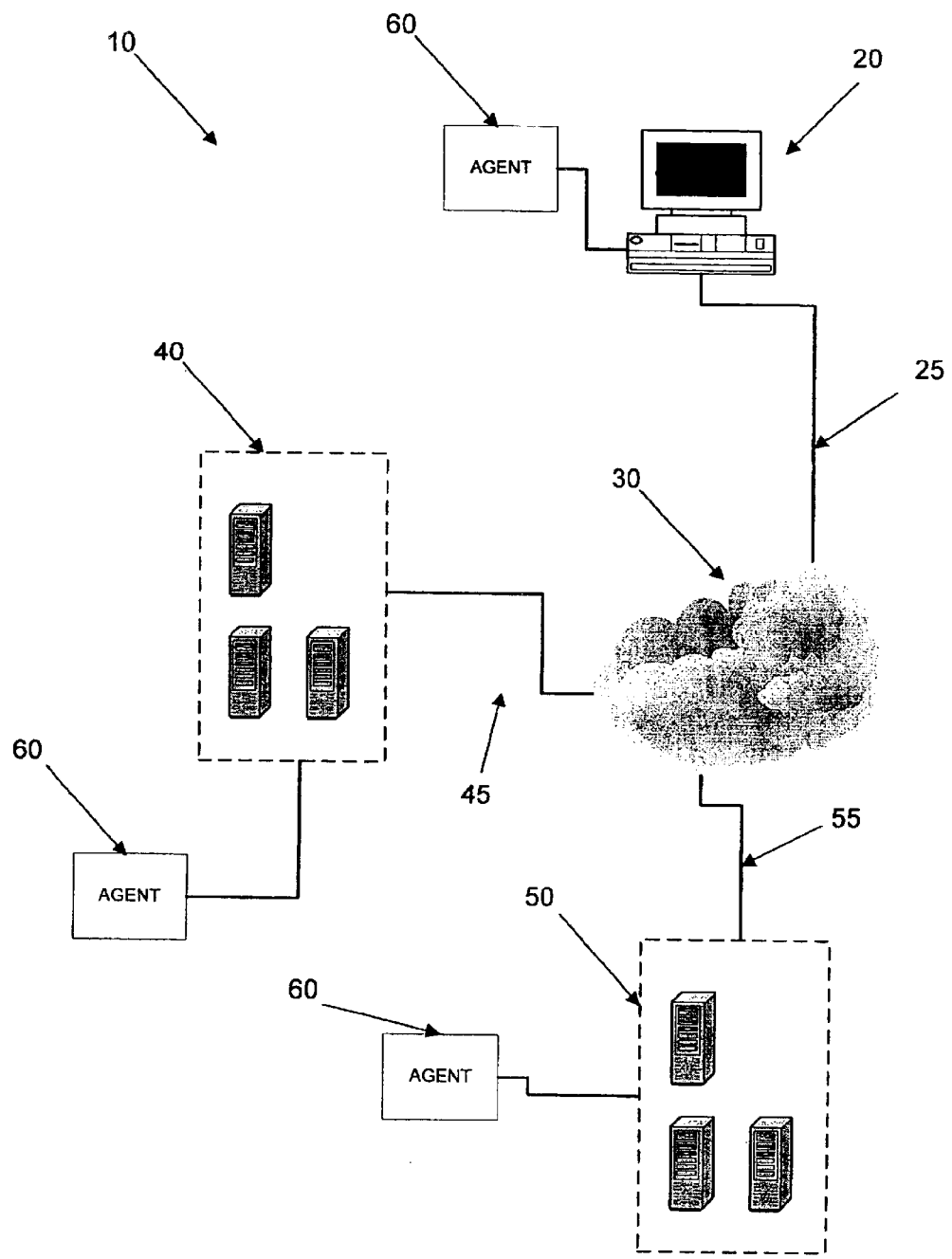
FIG. 1 diagrammatically illustrates a view of a system 10 according to an aspect of the present invention.

It is to be understood that the figures and descriptions of the present invention have been simplified to illustrate elements that are relevant for a clear understanding of the present invention, while eliminating, for the purposes of clarity, many other elements found in a typical interactive systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

It should also be understood that while the present invention has a broad range of applicability ranging from young children, through high school students, college and university students, graduate students, business employees and self learning programs, for purposes of presenting a clear understanding of the present invention, the present invention will be discussed as it primarily relates to an educational system and method for a school age child. It is to be understood that this discussion is made by way of example only, and that numerous changes in the details of construction and combination and arrangement of parts may be made without departing from the spirit and scope of the invention.

According to an aspect of the present invention, rather than attempting to compete with other activities for the attention of a student, attractiveness of an existing or other activity may be leveraged to provide educational reinforcement and/or testing, as set forth more fully hereinbelow. Further, this reinforcement or testing may be tracked.

According to an aspect of the present invention, an agent may interact with a suitable device, so as to temporarily interrupt student activity with that device, or participation in the activity associated with that device, and provide educational services during, or proximate to, that interruption. Educational services may include presenting questions and answers, and/or the presentation of information, for example. The present invention will be discussed herein as it relates primarily to presenting questions and/or answers as the educational services. However, it should be understood that the discussion herein is by way of example only, and other types of educational services, such as the presentation of information, are considered to be within the scope of the present invention. According to an aspect of the present invention, the agent may take the form of suitable hardware and/or software. Based upon predetermined criteria associated with student interaction with the agent, including criteria entered by a controlling party of the education of the student, such as a parent, conventional student interaction with the suitable device and participation in the activity may resume until and following interruption by the agent. Additionally, feedback indicative of the student's interaction with the agent may be provided. It will be apparent to those skilled in the art that some or all of these steps may be performed in an automated fashion.

For example, and referring now to FIG. 1, there is diagrammatically shown a view of a system 10 according to an aspect of the present invention. The system 10 includes a computing device 20, communications network 30, activity resource provider 40, system resource provider 50 and agent 60. The device 20 is communicatively coupled to the resource providers 40 and 50 via network 30 and communication mediums 25, 45, 55, respectively.

Device 20 may take the form of any suitable computing device, such as a personal computer (PC) or other microprocessor based device. Other suitable microprocessor based devices include, without limitation, and by way of example only, television associated devices, such as a satellite receiver and/or recorder/replay device, such as that commercially available under the TiVo trademark, other video replay devices, such as VCR and DVD players, and gaming consoles, such as that commercially available under the PlayStation 2 trademark.

In general, the device 20 may include a user interface for interacting with a student, such as a conventional remote control, control pad, keyboard, mouse, pointer, touch screen, or the like. Of course, any means of permitting a user to interact with the device 20 is considered suitable.

The device 20 may include a communications device, such as a modulator-demodulator (modem), for communicating by way of the medium 25 using the network 30. The medium 25 may take the form of any suitable communication medium, such as a telephone line, wireless connection, DSL or cable connection, or combination thereof, for example.

In the illustrated case of FIG. 1, device 20 may take the form of a commercially available PC incorporating suitable software for communicating via a network, such as the Internet, via, for example, a commercially available web browser such as Internet Explorer, and other required hardware and software to enable its conventional operation using the device 20.

Network 30 may take the form of any communications network being suitable for transmitting information to and from the device 20. The network 30 may take the form of a Public Switched Telecommunications/Telephone Network (PSTN), Local Area Network (LAN), Wide Area Network (WAN), frame relay network, wireless network, or combinations thereof, to name a few non-limiting examples. In the illustrated case of FIG. 1, network 30 may take the form of the global interconnection of computing devices and computer networks commonly referred to as the Internet. Further, the mediums 25, 45, 55 and network 30 may take the form of several networks considered together to be a network. For example, a broadcast network may communicatively couple the device 20 in a wireless fashion to the activity resource provider 40 using satellite or terrestrial airwave transmissions, while the Internet provides communicative links between the device 20 and system resource provider 50.

Activity resource provider 40 may take the form of any combination of hardware and/or software being suitable for enabling a student to partake in at least one activity using the device 20. For example, wherein the device 20 includes a suitable combination of hardware and/or software for receiving a satellite television broadcast, and the network 30 includes at least a satellite television transmission system as is conventionally understood, provider 40 may include suitable hardware and/or software for preparing and transmitting to the network 30 satellite television signals which may subsequently be received and decoded using the device 20, for example. Further, in the illustrated case of FIG. 1, wherein the device 20 takes the form of a PC incorporating browser software, the provider 40 may take the form of one or more web servers including suitable hardware and/or software for sending data to and receiving data from the device 20 in a conventional manner, so as to enable the user to partake in the activity using the device 20. In such as case, the activity partaken by the student may take the form of what is conventionally referred to as "surfing the web".

According to an aspect of the present invention, use of a resource provider 40 may not be necessary. For example, wherein an activity to be partaken in by a student using the device 20 is a stand-alone video game running on a personal computer or gaming console, as is conventionally understood, no provider 40 may be necessary, as the device 20 may be capable of enabling a student to partake in an activity in a stand-alone manner, and as such is a standalone system resource provider 50. Examples of such include conventional game cartridges, or other media, such as CD-ROMs or DVDs, which may be inserted into a gaming console or other suitable device acting as device 20.

System resource provider 50 may take the form of any combination of hardware and/or software being suitable for interacting with the agent 60 to provide educational services, which may include testing services. This interaction may be in an automated fashion, and may occur over network 30, or locally over a hard-wired network 30, such as within device 20. According to the illustrated embodiment of FIG. 1, provider 50 may take the form of one or more web servers incorporating suitable hardware and/or software to interact with the agent 60 and device 20, as is conventionally understood.

According to an aspect of the present invention, agent 60 operates in conjunction with the device 20 to temporarily interrupt user activity with the device 20 to provide educational services or activity, which may include testing, for example. The agent 60 may take the form of any suitable combination of hardware and/or software for accomplishing such. For example, the agent 60 may take the form of a plurality of computer readable instructions, i.e., a program, being stored on a computer readable medium, e.g., a memory, hard disk, diskette, CD-ROM, DVD or other suitable medium. According to an aspect of the present invention, the provider 50 may not be necessary apart from the agent 60, as the agent may be configured to operate in a stand alone manner similar to that set forth hereinabove with respect to device 20. Further, the agent 60 may take the form of hardware communicatively coupled with the device 20 using any suitable interface, such as an RS-232 serial interface, Universal Serial Bus (USB) interface, keyboard interface or parallel port interface which may support Enhanced Parallel Port (EPP) functionality for example, to name a few.

An interface agent may be provided for use in the present invention, and is included, where provided, within at least one of the device 20, the agent 60, or the provider 50. The interface agent may allow, for example, the editing of interrupt criteria, the assessment of grading of the educational services, the editing of questions for the educational services, or the generation of new questions for the educational services. The interface agent is preferably manipulable only by authorized parties responsible for the presentation of the educational services, such as by a parent of the user of the device 20, for which user the agent 60 is used to provide educational services during interrupt. For example, a parent may log in to the agent interface, such as by using a log in name and password as will be apparent to those skilled in the art, and the parent may manipulate settings as to how often interrupt occurs, as to during which activities interrupt occurs, or as to what level or subject of questions are asked during interrupt. As an additional example, students in a classroom may have internet access, or may have access to a plurality of educational software. A pop quiz may be generated by the teacher, but the pop quiz may only interrupt in the instance wherein the student is not accessing other educational material, and is accessing, for example, the internet, or may only interrupt when the subject in which the pop quiz is based is currently being studied. For example, it might be undesireable to interrupt a user doing homework in history on a PC with mathematics questions, and the parent or teacher may program the interruption to that effect. Additionally, the parent or teacher may enter, or select from, new series of questions, such as downloading new questions from the provider 50 to the agent 60, or to the device 20 wherein the device 20 includes the agent.

For example, a plurality of databases may be maintained, in a location accessible by the agent 60 and/or the interface agent, such as at the provider 50. These databases may include different subject questions, or different levels of questions within each subject. Further, performance databases may be maintained that assess individual performance in the educational services, or that assess group performance in the educational services. In an embodiment wherein information about the user is entered prior to engaging in the educational services, performance may be assessed based on different groups, such as by age, educational background, or geographic location. Further, databases including questions for educational services may preferably be updated, such as when answers are changed due to outside circumstances, or such as when new questions are entered by controlling parties of the interface agents. Thus, in accordance with the present invention, questions of any type may be asked at any time, and performance may be assessed using known methodologies. Consequently, standardized testing may be performed outside of a scholastic environment, or targeted marketing techniques may be gauged by the responses of users of the educational services, such as where educational polls, or the like, are given during the interrupt. Further, individual or group weaknesses can be assessed, such as by teachers, in order to better target areas for student education improvement.

Figure 2:
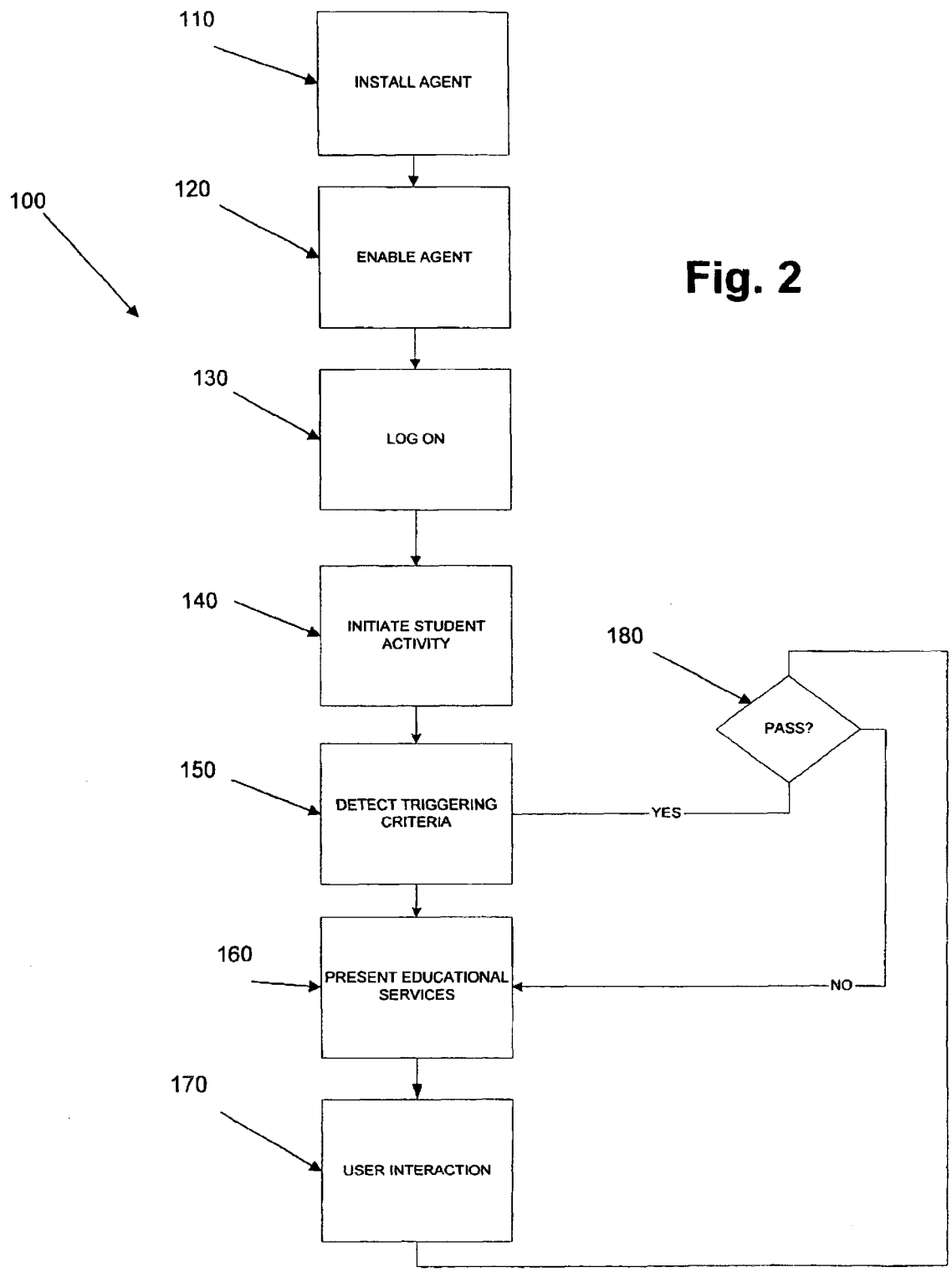
FIG. 2 illustrates a method according to an aspect of the present invention being well suited for operation using the system of FIG. 1.

Referring now also to FIG. 2, there is shown a method 100 according to an aspect of the present invention being well suited for operation using the system 10 of FIG. 1. According to an aspect of the present invention, the agent 60 can take the form of software which may be loaded 110, e.g., installed, onto a PC operating as the device 20. This can be accomplished using any suitable technique well understood by those possessing an ordinary skill in the pertinent arts, such that the agent 60 is stored on a computer-readable medium so as to be accessible for operation by the device 20. In the illustrated case of FIG. 1, the agent 60 may be written using any suitable programming language, such as a general purpose, high-level, object-oriented, cross-platform programming language, such as JAVA. The loaded agent 60 may then be activated such that at least one instantiation of the agent is running on the device 20. The instantiated agent 60 may cooperate with the device 20, using browser software operable on the device 20 for example, to communicate via network 30 with education service provider 50.

According to an aspect of the present invention, a student may be identified to the agent 60, such as by logging onto the device 20 using any suitable manner 130. For example, the student may enter an identifier such as a user ID, as is conventionally understood, which may be cross-referenced against a table of known users using conventional methodology. Operation of the device may or may not be protected by using a password in combination with the user ID. According to an aspect of the invention, the agent 60 may not be user dependent, but rather may operate in a default mode associated with a particular student, or directly query the student for an identifying characteristic, such as a user identification. According to an aspect of the present invention, the student may log onto the device 20 prior to activation of the agent 60.

The student may initialize so as to partake in some activity of the user's choice 140. For purposes of explanation, the system 10 and method 100 will be further discussed herein with regard to the activity of surfing the Internet. According to an aspect of the present invention, the device 20 may include suitable browser software for accomplishing such. In such a case, the initialization 140 may include launching the browser software using conventional methodologies. For example, upon launching of the browser software, communications between the network 30 and device 20 can be established.

The student may then partake in the desired activity. For example, the student may enter a desired Uniform Resource Locator (URL) address for a desired web page the student wishes to interact with. Using well understood techniques, the browser may request services, such as a web page using a Hyper Text Transfer Protocol (HTTP) request, from provider 40. Provider 40 may respond in a conventional manner so as to communicate the requested services, such as the requested web page, to the device 20 via network 30 and communications mediums 45, 25. The delivered web page may then be interacted with by the student using the device 20. FIG. 3 illustrates a basic representation of a conventional web page 200 being displayed using browser software, which web page corresponds to the student entered URL 210 (WWW.USPTO.GOV) that has been delivered to a PC running a suitable version of Microsoft Windows as device 20, for example.

According to an aspect of the present invention, based upon detection 150 of a predefined criteria, the agent 60 may temporarily interrupt a student's otherwise conventional use of the device 20 and activity to provide educational services. For example, after a predetermined amount of time, such as a given number of minutes, such as twenty, the agent may substantially require the student to interact with the agent prior to further interaction with the browser. According to an aspect of the present invention, the predefined criteria may take any suitable form. It may, for example, be temporally based, activity based, or pseudo-random in its triggering nature. The criteria may be fixed or itself be subject to change, in response to questions being answered correctly, or current question difficulty level, for example. The criteria may be based upon iterations, such as a number of web pages being requested, or a number of keystrokes or clicks performed using a pointing device connected to the device 20, for example, or based upon the activity itself, such as successful completion of a level of a game serving as the underlying activity.

Upon detection of the criteria 150, educational services may be provided 160. Referring now also to FIG. 4, there is shown the web page of FIG. 3 after some predetermined criteria has triggered the agent 60 to activate. Again, there is shown the basic representation of FIG. 3 of a conventional web page 200 being displayed using browser software, which web page corresponds to the student entered URL 210 (WWW.USPTO.GOV) that has been delivered to a PC running a suitable version of Microsoft Windows as device 20, for example. Additionally, in the illustrative example of FIG. 4, agent 60 has triggered that an active window 220 corresponding to the agent be presented to the student.

According to an aspect of the present invention, the agent 60 may require the student to interact with it 170 prior to the student continuing to interact with the device 20 in a conventional manner. For example, the window 220 may be presented to the student to provide the student an opportunity to interact with the agent 60. In the illustrative example of FIG. 4, the window 220 presents at least one question 230, or information item, to the student. In the illustrative example of FIG. 4, the window 220 further may present a plurality of potential answers 240 to the student, although the student may be requested to provide an answer without the assistance of a list of possible answers. Additionally, help, or one or more other hint types, may optionally be provided, either in response to a request from the student for such, or automatically with the question, or after some other predefined criteria, such as another temporal period, has been detected. The student is then given an opportunity to interact 170 with the agent 60.

Referring now also to FIG. 5, upon student interaction with the agent 60, the agent 60 determines, based upon some predefined criteria, for example, whether the student is to be permitted to resume conventional activity, e.g., whether the student has passed the educational test 180, or has seen the desired information. If the student is determined to have passed the educational test, the student may be permitted to resume conventional activity, via conventional interaction with the device 20, for example. Optionally, the student may be provided with notification that the student has successfully interacted with the agent 60, such as is shown in the illustrative embodiment of FIG. 6. Therein, the student may be congratulated for correctly answering the question 230 by notice 260. Thereafter, the user may be permitted to resume ordinary use of the browser and device 20, e.g., as is represented by step 160 (waiting for detection of the predefined criteria) and FIG. 3.

If it is determined at step 180 that the student has failed to successfully interact with the agent 60, the student may be prompted to try again. For example, the student may be provided with an explanation of why the student has not been permitted to return to conventional activity, or with a hint, and may be provided another opportunity to interact with the agent 60 by returning to step 170 as is shown in FIG. 5, which includes notice 250. Alternatively, a failure may be recorded for future use, such as for repetition of the failed question or questions.

Referring still to FIG. 2, feedback indicative of the student interaction with the agent 60 may be recorded using any suitable computer-readable storage medium. For example, data indicative of the performance can be stored in Random Access Memory (RAM) and/or stored using a less volatile memory device, such as a hard drive or non-volatile RAM device, such as those commonly used in connection with gaming consoles and referred to herein as memory cards. This data may be provided to a person monitoring educational progress directly using the device 20, such as the parent or teacher discussed hereinabove, via a display, for example. Further, this data may be communicated via the network 30 to provider 50, where it can be provided to a person monitoring educational progress, or to an automated monitor of the performance database, in any suitable form, such as via an electronic report which may be accessed via the network 30 using a browser software or a suitable computing device, for example. The data may be provided to the provider 50 automatically, such as continuously, or in response to some predetermined criteria, such as a student successfully interacting with a given number of queries for example. Further, an electronic mail (e-mail) message may be automatically prepared based upon the communication data and sent to an e-mail address which has been previously stored and is associated with the person monitoring the educational progress. Further, a report or other visual indication of the student's interaction with the agent 60 may also be provided in hard copy form, which may be printed using a suitable device communicatively coupled to the device 20, or which may be mailed or automatically facsimiled to a previously stored phone number corresponding to a person monitoring the educational progress.

According to an aspect of the present invention, the agent 60 may request and/or receive information indicative of the educational services from the provider 50, and use this information to provide the educational services. This information may be pre-provided to the agent 60 and stored or cached using a suitable memory device for example, or provided upon detection 150 of a triggering event.

As set forth hereinabove, use of provider 50 may not be necessary, such as wherein the agent 60 may be configured to operate in a stand alone mode. That is, information indicative of the educational services may be stored as data on a computer-readable medium, for example, so as to be accessible by the agent 60. Upon detection 150 of the predetermined triggering criteria, the agent may access the stored information for purposes of retrieving at least a subset of the stored information to use in presenting the educational services 160.

According to an aspect of the present invention, the information indicative of the education services may be modified, such as by updating, or changed. This may be accomplished by installing additional software on the device 20 so as to modify the stored information, which may be advantageously used wherein the agent 60 takes the form of software running on the device 20, for example.

The modification or updating may be accomplished by directly accessing the agent 60 using activity server 50, for example. By way of non-limiting example, this can be accomplished in a manner well understood. For example, wherein the agent 60 takes the form of hardware and/or software operating in conjunction with a signal receiver acting as device 20, data indicative of the update or change may be broadcast to the receiver in a conventional manner. Wherein the network 30 includes a satellite television transmission network as has been previously discussed, data indicative of the update or change may be transmitted via the satellite transmission network to the receiver acting as device 20, which data may then be provided to the agent 60 for use. Of course, data indicative of changes or updates may be provided specifically to known ones of the agents 60 by addressing known corresponding receivers as is conventionally understood.

Further, the agent 60 may include suitable methodologies for communicating via the network 30. For example, the agent 60 may include a modem, which may be coupled to any suitable communications medium, such as a telephone line. The agent 60, using the modem, may initiate a communications session with the provider 50, or the provider 50 may initiate a communications session with the agent 60. The provider 50 may thereby provide additional information to be used for providing the educational services.

According to an aspect of the present invention, the agent 60 may be configured to operate in conjunction with existing hardware and/or software as an integral product. For example, the use of devices which alter the operation of programs on gaming consoles are generally known, such as those commercially available under the GameShark trademark, for example. Further, the agent 60 may be included with other programs, for example, such as on a same media as a game or DVD for use on a device 20. As set forth, the device 20 may take the form of a gaming console or other suitable microprocessor based device, such as a DVD player. In such a case, the agent 60 may be pre-loaded onto a DVD or cartridge otherwise being suitable for conventional use with the corresponding device 20. The device 20 may then operate the agent 60 using conventional methodology. For example, an application serving as agent 60 being stored on a DVD, when selected, may cause select ones of chapters of an audio/visual presentation on the DVD to be displayed in a conventional manner. The display may be interspersed with the provision of educational services as has been set forth.

Further, the agent 60 may take the form of hardware adapted to use an existing memory card or cartridge adapted for conventional use with a gaming console, for example. The memory card can be programmed using a first game console compatible media, such as a cartridge or DVD, to provide a memory occurrence of the information indicative of the educational services to be provided. The game console may be operated in a conventional manner using a second media, such as a cartridge or DVD, to provide the underlying student activity. The agent 60 can take the form of software and/or hardware to access the stored memory occurrence and provide the educational services. The agent may include a hardware and/or software lock as is conventionally understood to thereby require use of the agent 60 to enable use of the activity media.

According to an aspect of the present invention, the triggering event to be determined 150 (FIG. 2) can take any suitable form. For example, and as set forth hereinabove, the criteria may be temporally or iteratively based. Further, the criteria may be based upon an occurrence in the activity. For example, the device 20, as set forth, can take the form of a television associated device, such as a decoder and memory device, like that commercially available under TiVo trademark.

For example, in the event of the detection of a commercial insertion using conventional methodology, the underlying activity audio/visual presentation can be temporarily suspended pending student interaction with the agent 60. Optionally, should the student's interaction temporally exceed the temporal period associated with the commercial insertion, the agent 60 may control the device 20 to begin recording the underlying activity audio/visual presentation. In such an event, the student is provided a sufficient time period for interacting with the device 20, without the risk or anticipated anxiety of missing a portion of the underlying activity audio/visual portion.

According to an aspect of the present invention, the educational services need not be directed to a single user. In the case wherein the underlying activity is a multi-user activity, such as a telephone call, instant messaging, chat group or other on-line multi-user application for example, the educational services may be provided to the group of users, a subset of the group of users, or any one of the users. According to an aspect of the present invention, agent 60 may be operated in conjunction with resources used to provide multi-user applications to provide educational services.

It should be understood that the conventional use of "chat groups" on the Internet is a growing trend among student age children, as well as other demographic groups. A chat group application typically features real-time, or substantially real-time, communication between multiple users via computing devices and is herein defined to include conventional internet surfing. Once a chat session has been initiated, any of the users can typically enter text by typing on the keyboard, and the entered text will appear on the other users' monitors. Many computer networks and on-line services offer chat group applications or capabilities. A chat group may use communications servers ("chat servers") that allow information to be served to a large number of users in an environment featuring substantially real-time discussion capabilities. Dynamic voice and/or video support may also be provided.

According to an aspect of the present invention, chat group servers may temporarily interrupt student use of chat groups operated using the chat servers, in order to provide educational services. For example, each user of chat services may have a corresponding user identification that may be authenticated to confirm each user's identity and provided characteristics. For example, each member of a class in a school may be provided with a user identification for use with chat services. This identification can be used to classify the user as belonging to a specific group of users, such as users currently taking particular coursework at a specific learning institution, for example. Based upon some predetermined criteria, educational services provided may be directed towards these classifications using the chat servers. In such a case, each student may use a PC as device 20 to access chat servers operating as activity provider 40 via the Internet serving as network 30. The agent 60 may take the form of hardware and/or software which operates in conjunction with the chat servers, or may be implemented using other servers as provider 50.

For example, the agent 60 may, after some predetermined temporal period, temporarily interrupt a user's interaction with the chat group and request user interaction with the agent 60. This may be accomplished in any suitable manner, such as either directly by the chat servers having agent 60 loaded thereon in software form, on separate servers and/or software acting in conjunction with the chat servers, or as hardware and/or software operating on a student's PC. Thus, the agent, and/or the use thereof, may be purchased by users, server operators, or controllers, or may be licensed, either permanently or renewably, for operation with systems discussed herein.

The educational services provided may be individually provided to a single user, or to a group of users collectively, as set forth hereinabove. For example, a subset of the users of a chat service at a particular time may satisfy some common criteria, such as they are all currently taking common coursework, such as a class in a foreign language. The criteria may be automatically determined using stored profile information associated with the user identification, for example. This subset of users may be collectively provided educational services associated with this common criteria. The subset of students may be provided a workgroup environment for purposes of partaking in the educational services. That is, using the inherent characteristics of the real-time, multi-user environment, the subset of users collectively form a temporary on-line community for solving a problem which may be automatically presented by the agent 60, for example. Each of the members of this temporary community may engage in dialogue with the other users regarding the problem. Each of the members may be required to submit a "best" answer, or the members may be persuaded to a common consensus regarding a collective answer that will be accepted, such as through majority voting, for example. Further, each of the members of the temporary community may be rewarded regarding the community performance with regard to the educational services, such as by receiving points indicative of the community performance. Data indicative of these points may be stored using well known techniques, for later retrieval and analysis by individuals monitoring a student's educational progress, for example, as set forth hereinabove with respect to FIG. 1. Further, accumulation of points may lead to other rewards, such as public recognition using the chat service as medium, or for other purposes. Of course, such a point accumulation system and method may be used with individual performances as well.

According to an aspect of the present invention, the device 20 may be, but is not necessarily, a microprocessor based device. For example, the device 20 may take the form of a communications device, such as a telephone, and the underlying activity may be the activity of communicating using the device. The activity of communicating may be temporarily interrupted to provide educational services as has been set forth. The agent 60 may take the form of hardware and/or software that monitors outgoing and incoming calls. For example, the agent 60 may take the form of an in-line switching device coupling the telephone to a PSTN.

In response to the agent detecting a predefined criteria, the agent may initiate a communications session with the provider 50 using well known techniques, such as by placing the underlying activity call on hold, for example. In the case of a telephone, educational services may be provided audibly, and an opportunity for the student to interact may be provided through the telephone, such as by dialing a predetermined sequence of numbers and capturing a corresponding DTMF signal, for example, or any other suitable technique, such as voice recognition. Upon completion of interaction with the agent 20 and provider 50, the agent 20 may reconnect the original underlying call activity.

Further, the agent 20 may provide the educational services by incorporating suitable hardware and/or software for interacting with the student without the need of provider 50, such as in a stand-alone mode.

Again, the user may be asked to identify the user, by dialing a predetermined sequence of numbers for example, or any other suitable technique, such as voice recognition. Alternatively, identification of a party may be assumed, either through use of the telephone itself or by the identity of another party to the call. An identity of another party to the call may be determined, or assumed, by capturing Dual Tone Multi-Frequency (DTMF) signals for outgoing calls, for example, or by monitoring incoming calls using caller ID data, for example. In such a case, the educational services may be provided only in the case of certain other parties being determined. Further, multiple parties to a call may be given an opportunity to collectively interact with the agent 20, akin to the chat group example provided hereinabove.

According to an aspect of the present invention, wherein a multi-party activity is the underlying activity, and more than one party is using an agent 20, the agents 20 may coordinate presentation of educational services by signaling one-another using well known techniques. For example, in the case of a telephone call, a DTMF sequence may be generated by one of the agents using conventional means, and detected by another of agents. Further, a data signal may be generated by one of the agents and communicated to another of the agents, such as over the network. By coordinating presentation, the time that one student is waiting for another student to interact with educational services may be used to educate the waiting student as well.

Although the invention has been described and pictured in a preferred form with a certain degree of particularity, it is understood that the present disclosure of the preferred form has been made by way of example, and that numerous changes in the details of construction and combination and arrangement of parts and steps may be made without departing from the spirit and scope of the invention as is hereinafter claimed.

What is claimed is:

1. A method for providing educational services to at least one user engaging in at least one activity, comprising:

automatically monitoring, by an agent, of the at least one activity;

detecting, by said agent, of at least one criteria comprising the event;

upon an event, automatically and temporarily interrupting, by the agent, of the at least one activity;

automatically presenting educational services to the at least one user by the agent during said interrupting; and, allowing the at least one user to reengage with the at least one activity based, at the point of said interrupting, upon an interaction with the agent during said presenting;

wherein the interaction is associated with the educational services;

wherein said automatically presenting comprises retrieving data from at least one remote database by any one of manual and automatic use of a Uniform Resource Locator address; and wherein said retrieving comprises generating at least one Hyper Text Transfer Protocol request.

2. A computer program product embodied on a computer-readable storage medium for providing educational services to at least one user engaging in at least one activity, said computer program product comprising:

code for enabling an agent to automatically monitor said user's engaging in said at least one activity;

code for automatically and temporarily interrupting said engaging in said at least one activity using said enabled agent upon an event;

code for detecting the event occurrence using said enabled agent;

code for automatically presenting educational services to said at least one user using said enabled agent; and, code for allowing said at least one user to reengage with said activity based upon user interaction with said enabled agent;

wherein said user interaction is associated with said educational services;

wherein said at least one user comprises a plurality of users, and said code for allowing said at least one user to reengage with said activity is based upon a collaborative interaction of said plurality users with said enabled agent; and wherein said code for retrieving comprises code for generating at least one Hyper Text Transfer Protocol request.

\* \* \* \* \*